United States Patent Office 3,392,492
Patented July 16, 1968

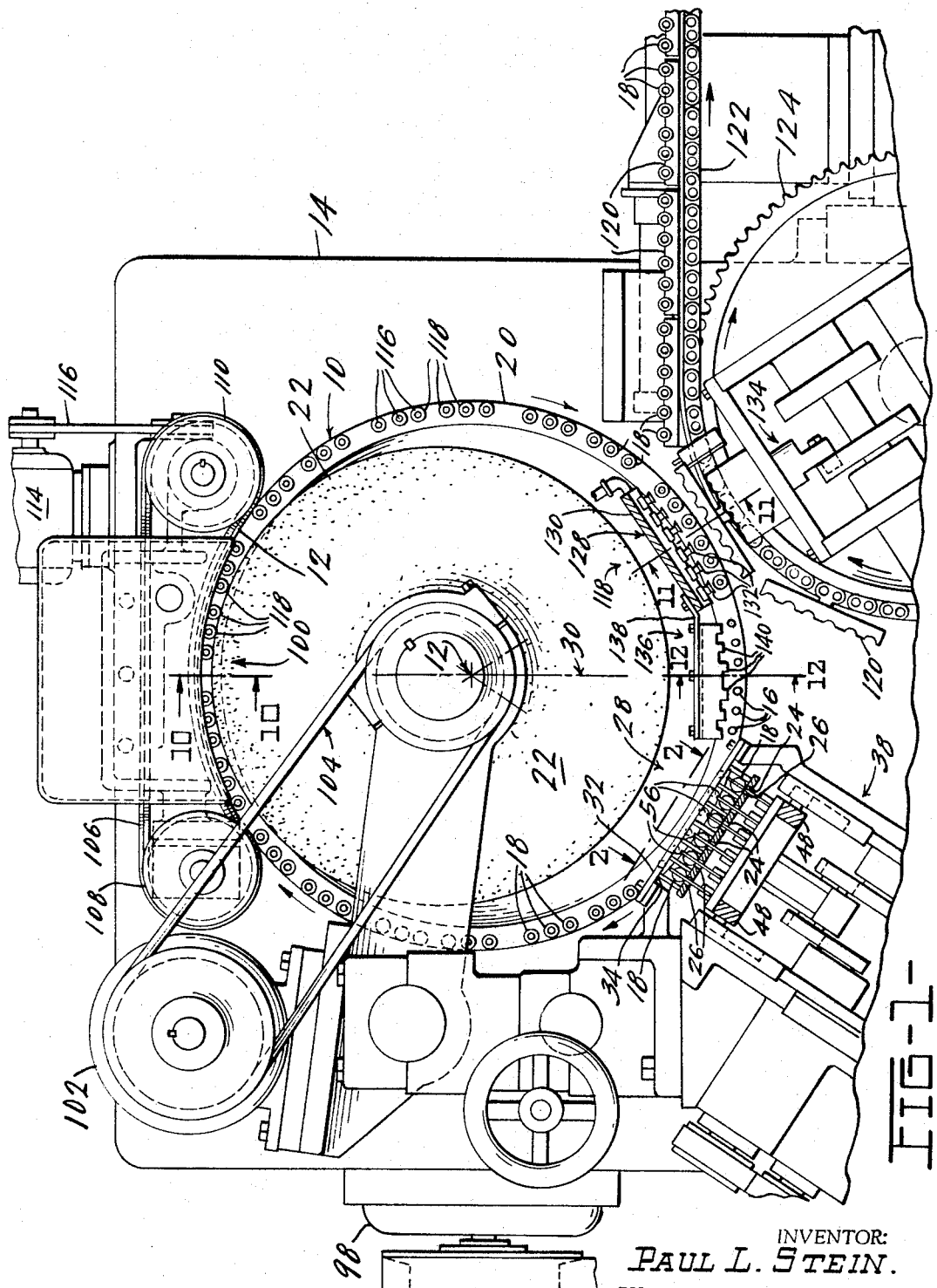

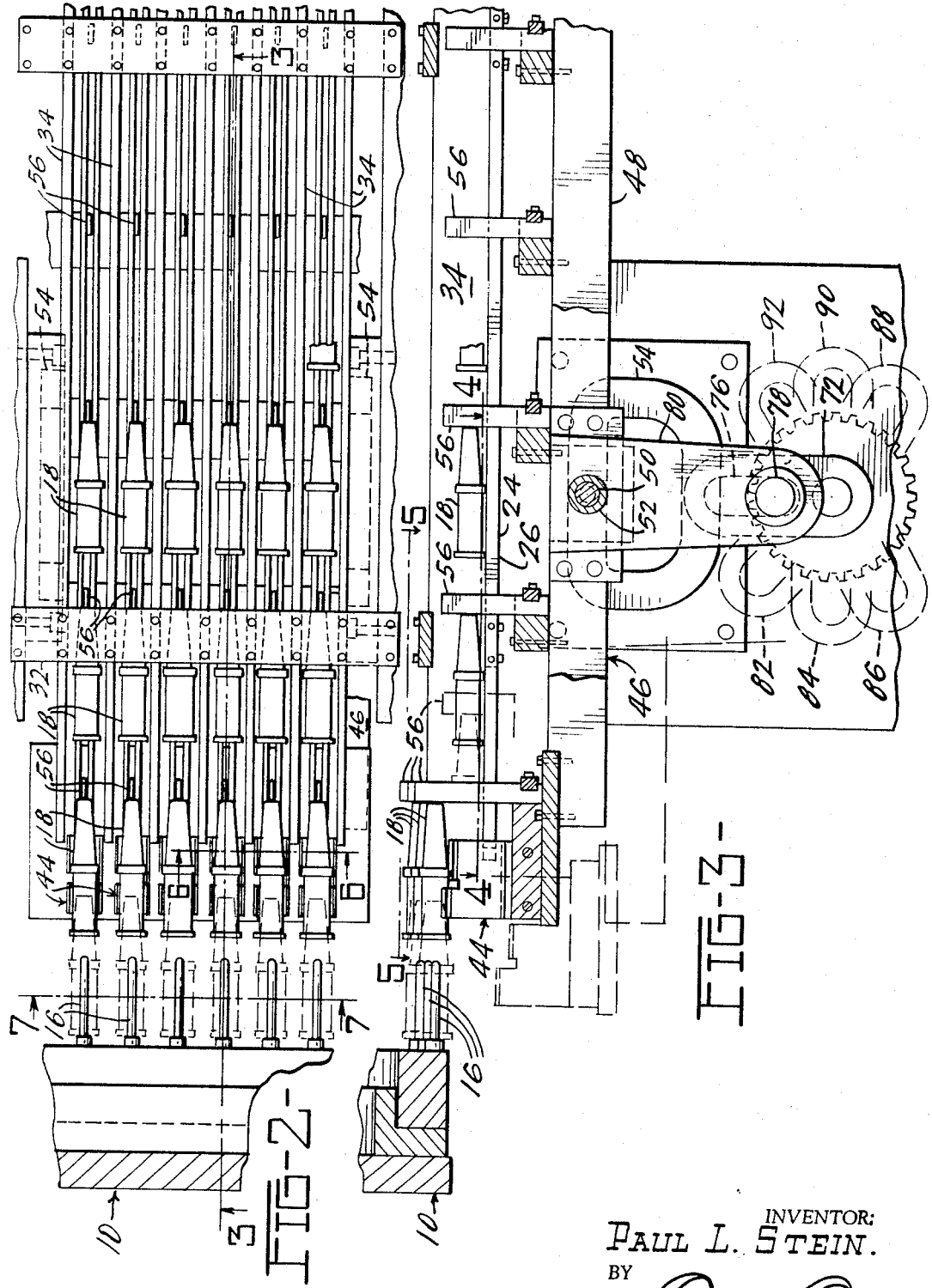

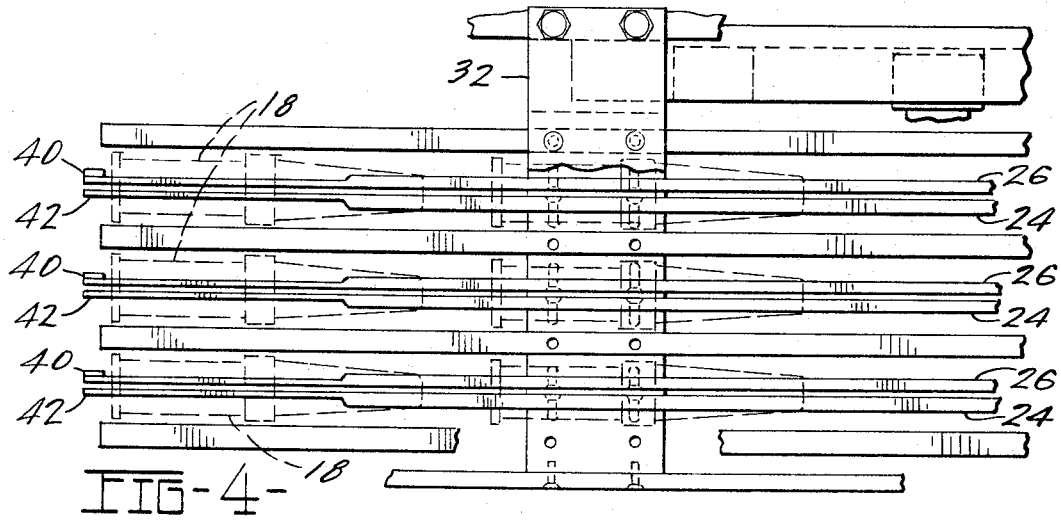
FIG-4-
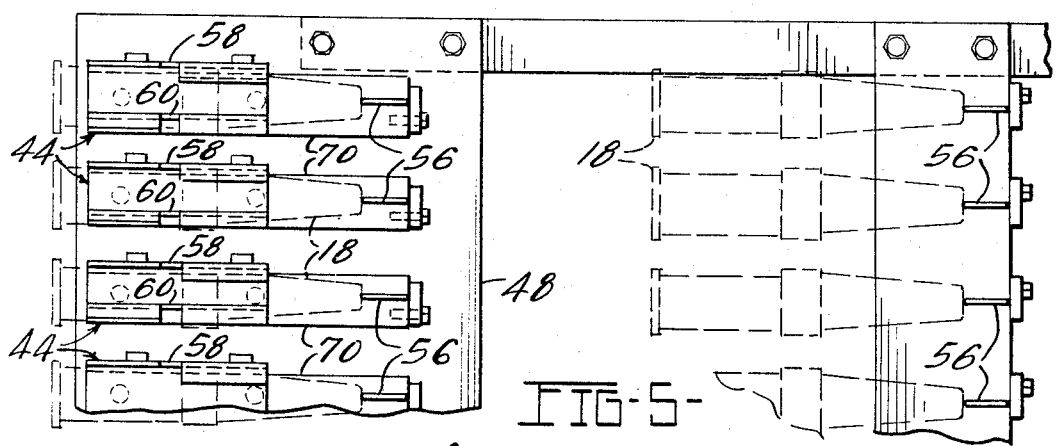
FIG-5-
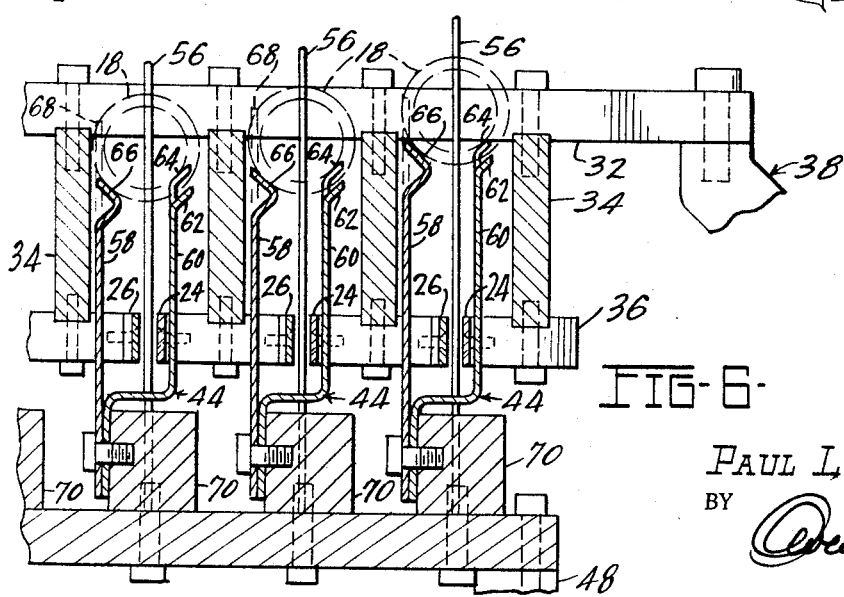
FIG-6-
INVENTOR:
PAUL L. STEIN.
BY
ATT'YS.

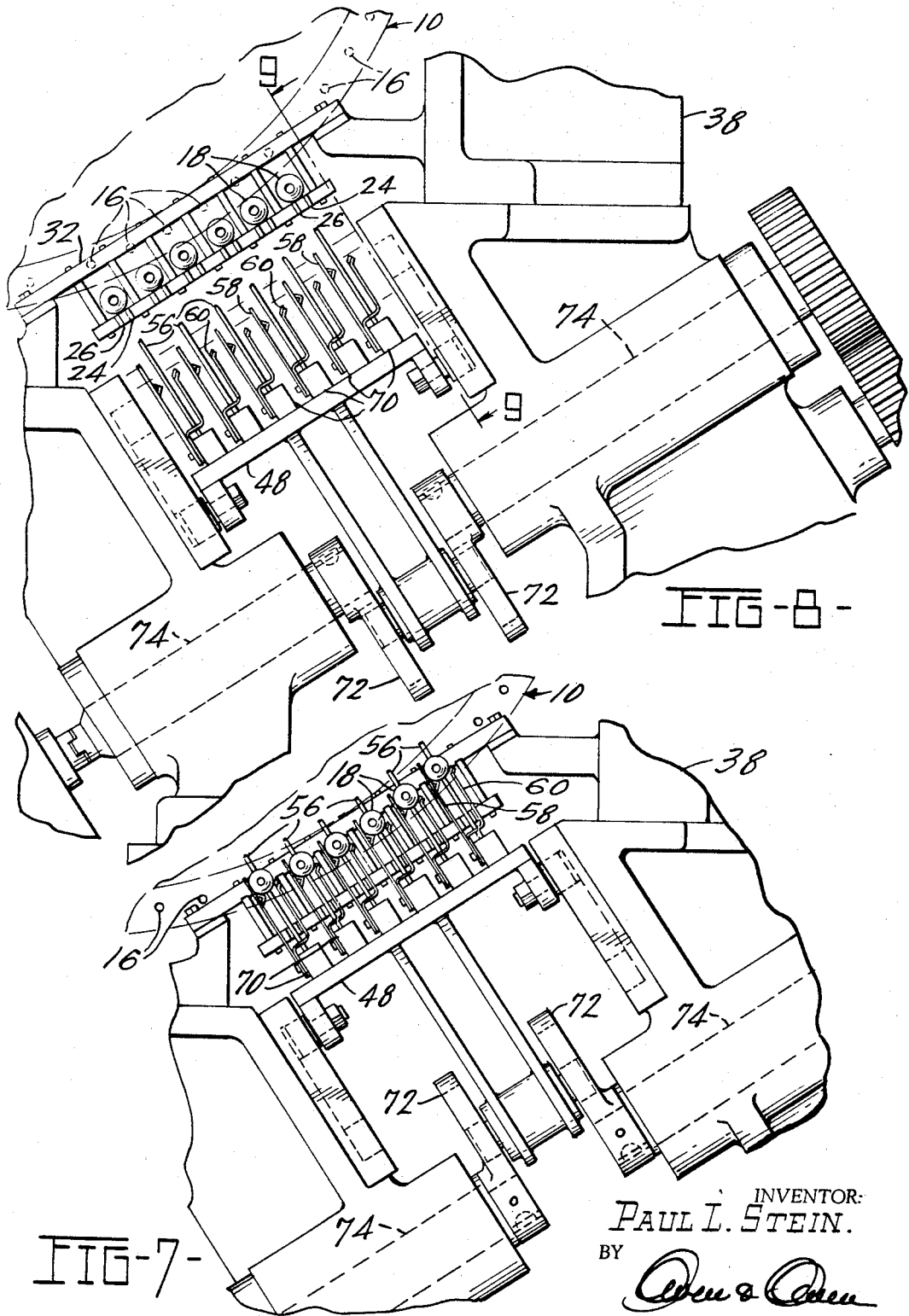

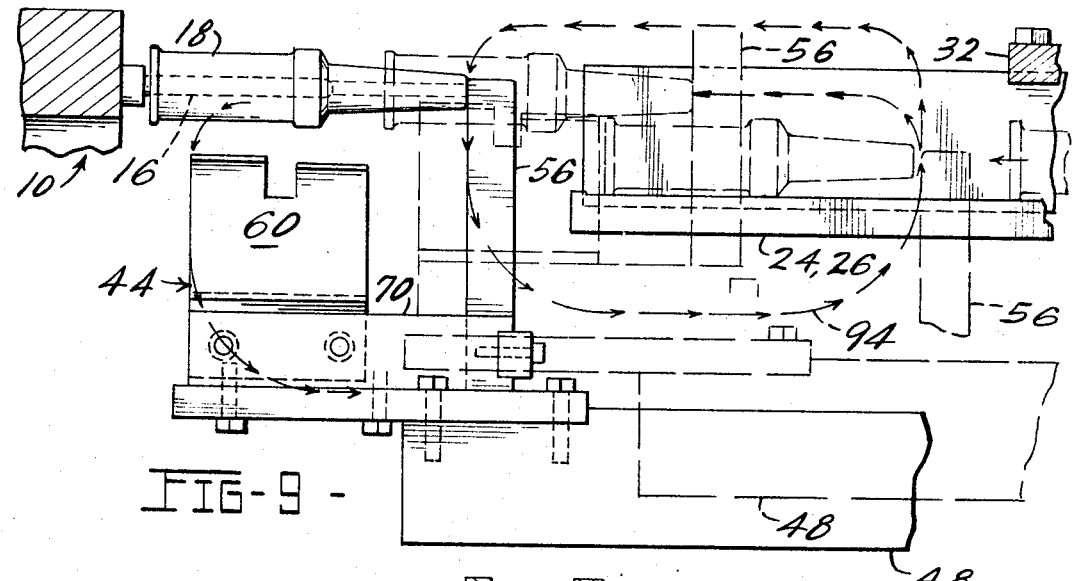
FIG-9-
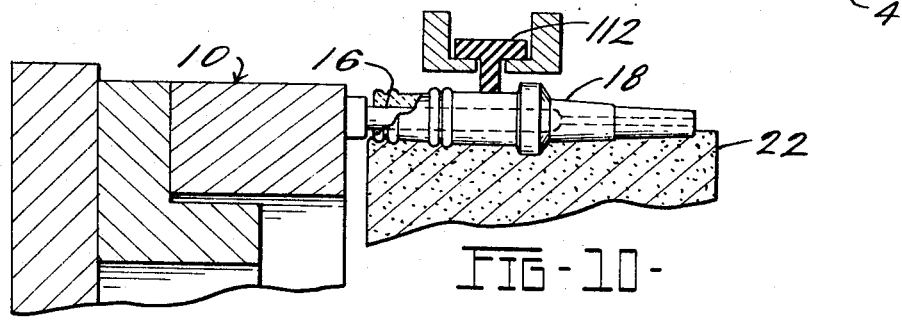
FIG-10-
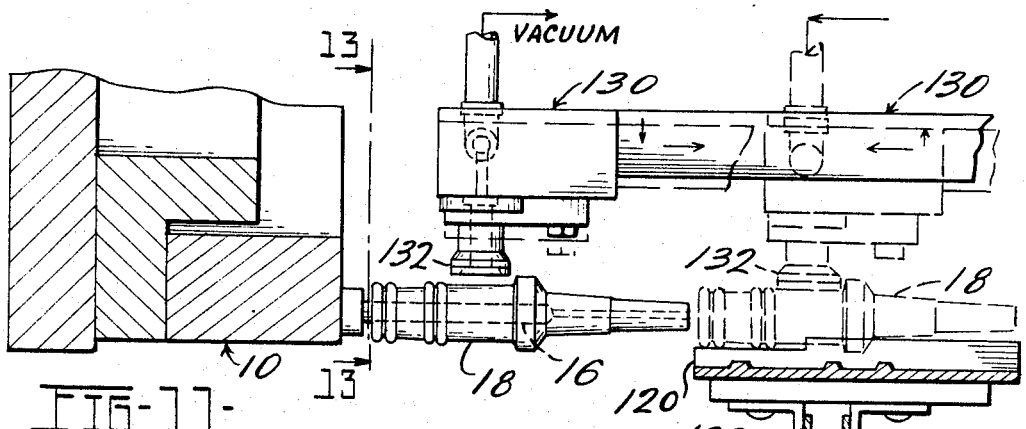
FIG-11-
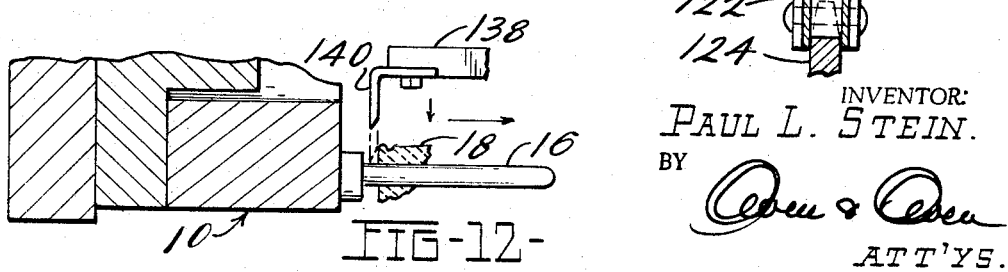
FIG-12-
INVENTOR:
PAUL L. STEIN.
BY
ATT'YS.

3,392,492
APPARATUS COMPRISING A TURRET AND APPARATUS FOR LOADING AND UNLOADING SAME
Paul L. Stein, Warren, Mich., assignor to Champion Spark Plug Company, Toledo, Ohio, a corporation of Delaware
Filed Oct. 19, 1965, Ser. No. 497,905
4 Claims. (Cl. 51—108)

ABSTRACT OF THE DISCLOSURE

Work transporting apparatus including a turret mounted for rotation about a horizontal axis. The turret has horizontally projecting spindles arranged in a circular pattern at a predetermined radius from the axis. A first conveying mechanism wherein workpieces rest on support surfaces is provided at a first work transfer station positioned adjacent the bottom and to one side of the vertical centerline of the turret. A second conveying mechanism is positioned adjacent the bottom and to the other side of the vertical centerline of the turret. Means are provided for moving a plurality of workpieces from the first transfer station onto a group of turret spindles. A second means for moving a plurality of workpieces from the turret to the support surfaces of the second conveying mechanism in the second work transfer station is provided. In a preferred embodiment, the second means includes a vacuum head having a plurality of vacuum cups, with the head being movable between a pickup position adjacent a plurality of workpieces on a group of turret spindles and a release position adjacent the tray support surfaces of the second conveying mechanism. A grinding wheel is positioned within the circular pattern defined by the turret spindles. The grinding wheel contacts the workpieces as they pass their uppermost position, abrading the workpieces to a predetermined shape.

---

This invention relates to an improved apparatus for loading and unloading a turret, and more particularly to such an apparatus for use with a grinding wheel having a unique arrangement by which the workpieces are transported from a first location past a grinding wheel to another location for further treatment.

There are many different types of conveyor mechanisms wherein the articles transported rest in an unconfined manner upon the upper surface of the conveyor mechanism, and these mechanisms have advantages in that observation of, and access to, the articles can be had at all times. A difficult problem exists, however, in using this type of conveyor mechanism for both feeding articles to, and removing articles from a turret structure; particularly when the space radially inwardly of the path of the articles around the turret is occupied by other mechanism such as a grinding wheel.

According to the present invention an arrangement is provided whereby a turret structure is both loaded and unloaded by tray type mechanisms located outside of the turret structure. Physical interference between the loading and unloading mechanisms is avoided by supporting the turret vertically, and by loading and unloading the vertically supported turret on opposite sides of the vertical centerline passing through the turret. In the preferred arrangement, at least one of the loading and unloading mechanisms is a tray conveyor, one end sprocket of which is positioned to one side of the vertical centerline with the conveyor extending away from the turret. The end sprocket is positioned so that the tray surfaces onto which the workpieces are loaded, or unloaded as the case may be, are on an incline to the vertical and are opposite the turret at the location where the transfer of workpieces takes place. By loading or unloading the conveyor in this manner, the entire conveyor structure can be located on one side of the turret structure and the space on the opposite side of the turret structure can then be occupied by the other of the conveying mechanisms.

An object of the present invention is the provision of new and improved apparatus of the above described type which is simple in design, rugged in its construction, and efficient in its operation.

Another object of the invention is the provision of a new and improved apparatus of the above described type wherein workpieces are fed to and removed from a turret structure by conveying apparatus wherein the workpieces merely rest in an unconfined manner on support surfaces.

Another object of the present invention is the provision of a new and improved apparatus of the immediately above described type and which is so arranged that the angle of convergence between the workpieces and the grinding wheel is a minimum.

A still further object of the invention is the provision of new and improved apparatus of the above described type wherein the grinding wheel is located within the circular path of spindles carried by the turret, and the conveying mechanisms which load and unload the turret utilize a bare minimum of space radially inwardly of the spindles.

The invention resides in certain constructions and combinations and arrangements of parts; and further objects and advantages of the invention will become apparent to those skilled in the art to which it relates from the following description of a preferred embodiment described with reference to the accompanying drawings forming a part of this specification, and in which:

FIG. 1 is a fragmentary side elevational view of apparatus embodying principles of the present invention;

FIG. 2 is a fragmentary enlarged plan view as seen from the line 2—2 of FIG. 1;

FIG. 3 is an enlarged fragmentary sectional view taken along the line 3—3 of FIG. 2;

FIG. 4 is an enlarged fragmentary sectional view taken along the line 4—4 of FIG. 3;

FIG. 5 is an enlarged fragmentary view taken along the line 5—5 of FIG. 3;

FIG. 6 is an enlarged fragmentary sectional view taken along the line 6—6 of FIG. 2;

FIG. 7 is a fragmentary sectional view taken along the line 7—7 of FIG. 2;

FIG. 8 is a fragmentary sectional view similar to FIG. 7 but showing the workpiece advancing mechanism in its lower position;

FIG. 9 is a fragmentary elevational view taken approximately on the line 9—9 of FIG. 9;

FIG. 10 is a fragmentary sectional view taken approximately on the line 10—10 of FIG. 1;

FIG. 11 is a fragmentary sectional view taken approximately on the line 11—11 of FIG. 1;

FIG. 12 is a fragmentary sectional view taken approximately on the line 12—12 of FIG. 1.

Figure 13:
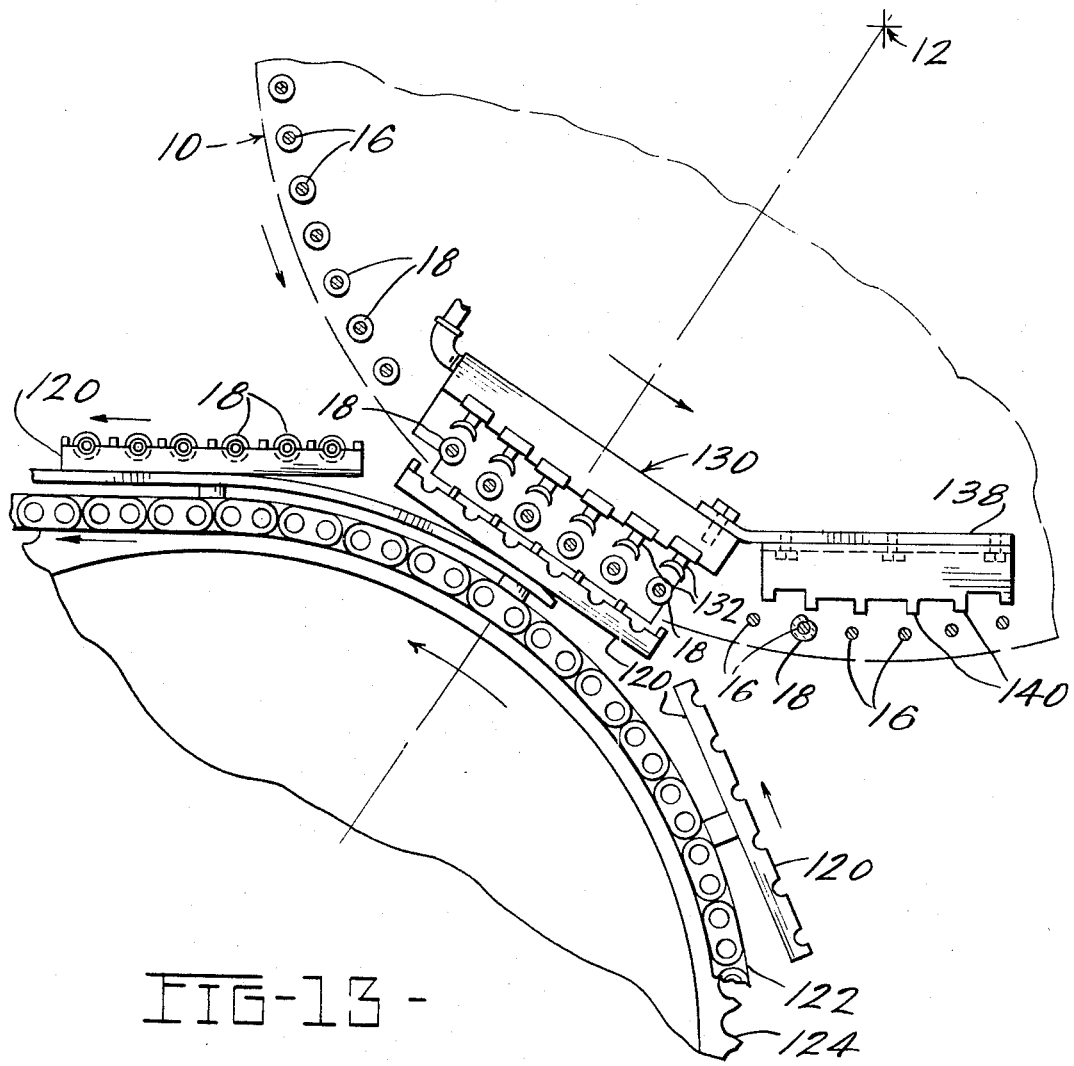
FIG. 13 is a fragmentary elevational view taken on the line 13—13 of FIG. 11.

Although the invention may be used to perform any type of work on workpieces as they move between two locations, it has particular advantages, and is shown in the drawings, as embodied in apparatus for grinding generally tubular articles to a predetermined accurate configuration. The apparatus shown in the drawings generally comprises a turret 10 which is mounted for rotation about a horizontal axis 12 by a shaft (not shown). The turret 10 may in some instances be journaled on the shaft, but in the arrangement shown in the drawings is fixed to the shaft, and the shaft in turn is journaled in an upright portion of the housing 14 of the machine. While in some instances any type of structure can be used on the turret for supporting the workpieces, the apparatus shown in the drawings is provided with a plurality of axially extending spindles 16 which are located at a fixed radial distance from the axis 12, so that generally tubular workpieces 18 telescoped over the spindles 16 are moved in a circular path by the turret 10. Various types of mechanisms can be used to contour the workpieces as they are moved around this circular path 20. In the embodiment shown, the workpieces are ground, and particular advantages are obtained by grinding the workpieces 18 with a circular grinding wheel 22 positioned inside of the circular path 20. Further advantages exist when the grinding wheel 22 is of a diameter approaching the diameter of the circular path 20 by reason of the fact that the angle of convergence between the workpieces and the grinding wheel is a minimum. A problem exists, however, in providing a completely operable apparatus which will automatically load and unload workpieces onto and from the turret structure when the size of the grinding wheel approaches that of the circular path of the workpieces since very little clearance remains within the circular path for the loading and unloading portions of the apparatus.

A further problem exists when it is desired to load and unload the turret structure by means of conveying mechanisms of the type wherein the workpieces merely lay on supporting surfaces. Such conveying structures have many advantages aside from their simplicity, among which are that they allow the operator access to the parts at all times.

In the apparatus shown in the drawings, the turret 20 is loaded with workpieces 18 at a position approximately 32.7 degrees in the direction of turret rotation from its bottom centerline position. Various types of apparatus can be used for loading the workpieces onto the turret, and in the embodiment shown in the drawings, the workpieces 18 are slid along pairs of spaced apart rails 24 and 26, see FIGS. 2, 3 and 4. The rails 24 and 26 of each pair are generally opposite hand from each other and each pair terminate at a point below and centered at a location 32.7° to one side of the vertical centerline 30. Inasmuch as the spindles 16 to be loaded are located generally along a line which is at an angle of 32.7° to the horizontal, the upper surface of the rails lie in a plane inclined at 32.7° to the horizontal. In the embodiment shown in the drawings, the spindles 16 are arranged in groups of six on the turret structure 10, and six pairs of the rails 24 and 26 are provided for conveying workpieces to respective ones of the spindles.

The pairs of rails 24 and 26 are hung from crossbars 32 by longitudinally extending bars 34 that fastened to the bottom side of the crossbars 32 and by spacer blocks 36 fastened to the bottom of the longitudinally extending bars 34. The spacer blocks 36 are positioned between the respective pairs of rails 24 and 26 with a rail 24 of one pair being bolted to one side surface of the block 36 while a rail 26 of an adjacent pair of rails is fastened to the opposite side surface of the block 36. This arrangement leaves the space between rails 24 and 26 of each pair without an obstruction for reasons which will later be apparent. A plurality of crossbars 32 are provided at spaced-apart intervals, and these crossbars are supported from the housing 38 of the machine. The ends of the rails 24 and 26 adjacent the loading position 28 for the turret are provided with stops 40 to prevent the workpieces 18 from being slid endwise off of the rails. The sections 42 of the rails 24 and 26 immediately adjacent the stops have portions of their width removed to provide clearance for workpiece elevating structures 44 that are part of a conveying mechanism generally indicated at 46 and which is about to be described.

The workpiece conveying mechanism 46 is adapted to slide workpieces resting upon the pairs of rails 24 and 26 stepwise toward the turret 10 until they reach the ends of the rails, whereupon the workpiece elevating structure 44 of the conveying mechanism 46 raises the workpieces 18 and telescopes them over the axially extending spindles 16 of the turret 10. The conveying mechanism 46 comprises a walking beam 48 which is supported at spaced-apart locations by cross pins 50 having roller bearings 52 on their opposite ends and each of which are received in a horizontal D-shaped camming recess 54 in opposed spaced-apart portions of the housing 38 of the machine. Reciprocatory movement of the walking beam 48 causes the roller bearings 52 to move around the horizontal D-shaped camming recess 54. During one portion of the reciprocatory movement, the cross pins and rollers move horizontally along the top portion of the recesses to advance workpieces stepwise along the rails. A plurality of fingers 56 suitably mounted on the walking beam 48 at spaced-apart locations project upwardly through the space between the rails 24 and 26 and push upon the rear ends of the workpieces. The spacing of the fingers 56 longitudinally of the rails is slightly less than the distance between the corresponding vertical portions of the cam 54 at opposite ends thereof, and the vertical portions of the cam are of such height that the fingers 56 move beneath the plane of the upper surfaces of the rails when the rollers 52 move along the lower arcuate portions of the camming recess 54.

The workpiece elevating structure 44 is fastened to the end of the walking beam adjacent the turret structure and comprises pairs of elevating plates 58 and 60 having upper ends suitably shaped to support the lower surface of the workpieces 18 at longitudinally spaced points. The elevating plates 58 and 60 are positioned on the respective sides of the reduced thickness portions 42 of the rails 24 and 26. Each of the elevating plates 60 has longitudinally spaced-apart portions 62 and 64 of differing heights to support spaced-apart points of one side of the workpieces, and each of the elevating plates 58 has a bent portion 66 for supporting opposite sides of a workpiece and a straight portion 68 which extends upwardly past the centerline of a workpiece to prevent it from rolling off of the support portions 62, 64 and 66. The elevating plates 58 and 60 are suitably fastened to spacer bars 70 that are a part of the walking beam 48. The elevating structure 44 is located forwardly of the fingers 56 that are located closest to the turret 10, and is moved with the same motion as are the fingers 56. The elevating structure 44 lifts workpieces that have been advanced stepwise by the fingers to the loading position adjacent the turret, and slides them axially upon the spindles 16. Thereafter the elevating structure 44 is lowered, retracted and moved upwardly again to repeat the loading operation.

The mechanism for moving the support rollers 52 of the walking beam structure 48 around the camming recesses 54 generally comprises synchronously driven crankarms 72 carried by oppositely extending shafts journaled in the housing 38 and which are held parallel during their rotation by suitable gearing not shown. The opposing crankarms 72 have longitudinally extending slots 76 therein which receive opposite ends of a cross pin 78 fixed to the walking beam 48 by means of depending legs 80. Rotation of the shafts 74 causes the side surfaces of the recesses 76 in the arms 72 to move the cross pin 78 forwardly from the position shown in FIG. 3. During this forward movement, the pin 78 is free to move outwardly along the side surfaces of the recesses in the arms 72 to compensate for arcuate movement of the arms 72 until the parts reach the position shown generally by the dotted lines 82 in FIG. 3. Thereafter the walking beam 48 moves downwardly and the pin 78 moves radially inwardly along the recesses 76 through the center position 84 (shown in FIG. 3) to the lower position 86 shown in FIG. 3. The walking beam 48 swings arcuately rearwardly as the rollers 52 traverse the lower section of the cam recesses 54, and as the arms 72 are moved from the position 86 past their lower center position to a position 88 on the opposite side of the centerline. As the arms 72 are moved upwardly from the position 88, the pins 78 are elevated through a rear center position 90 to an upper inclined position 92 after which the rollers 52 then proceed forwardly to the position shown by the solid lines in FIG. 3. Each finger 56 of the walking beam, therefore, moves along a path corresponding to the shape of the camming recesses 54 as indicated by the path of the arrows 94 in FIG. 9. The work elevating structures 44 move along a corresponding path indicated by the arrows 96 in FIG. 9. FIG. 7 of the drawings shows the driving structure in the vertical position seen in FIG. 3; and FIG. 8 of the drawings shows the driving structure rotated 180° to its bottom center position.

An electric motor 98 and a drive arrangement not shown moves the turret structure 10 in steps of 32.727° with a dwell period between the steps. After one group of spindles 16 is loaded at the loading station 28, indexing movement of the turret moves workpieces which have been loaded on the spindles clockwise out of the loading position, and another set of six spindles are moved into the loading position 28. Workpieces on the spindles are, therefore, progressively moved in an arcuate path past a work station 100, which in the embodiment shown, is at the top most position of the turret structure. The contoured grinding wheel 22 is rotated by an electric motor 102 and V-belt drive 104, and the grinding wheel 22 is so positioned relative to the spindles 16 as to remove all material on the workpieces in excess of the desired contour. The workpieces 18 should preferably be revolved as they pass through the work station so that all of the periphery of the workpieces will be exposed to the contoured periphery of the grinding wheel as they pass through the point of minimum clearance between the spindles and grinding wheel. In the embodiment shown in the drawing this is accomplished by a generally T-shaped belt 106 which passes over the spaced pulleys 108 and 110 (see FIGS. 1 and 10). As indicated, the lower end 112 of the belt bears down upon workpieces carried on the spindles. The pulley 110 is driven by a motor 114 and V-belt drive 116 at a speed which causes the belt 112 to revolve the workpieces at a rate which causes all surfaces of the workpiece to be exposed to the grinding wheel over a short arcuate section adjacent the top of the wheel. After the workpieces have passed the top most position of the grinding wheel, they move up out of engagement therewith, and continued indexing movement of the turret brings the workpieces to an unloading station 118 positioned 32.7° to the opposite side of the vertical centerline from the loading station 28.

Inasmuch as the loading mechanism occupies the area beneath the turret and to one side of its vertical centerline, a problem exists on providing a conveying structure for removing workpieces from the unloading station 118. In the present embodiment, the problem is solved by an endless conveyor of the chain type having open top trays 120 fastened to the top side of the conveyor chain 122 at a point adjacent the center of each tray so that the trays stay substantially tangent to the chain as they pass around the head and tail sprockets. In the embodiment shown in the drawing, the tail sprocket 124 is so positioned that trays carried by the belt 122 are parallel to the spindles of the turret 10 at the unloading station 118. The trays, therefore, are at an angle inclined at 32.7° to the horizontal when parallel to the spindles at the loading station. The tail sprocket 124 is positioned so that the trays 120 are located just outwardly of the end of the spindles when in the unloading station 118, and the workpieces are slid endwise off of the spindles and are moved down into workpiece receiving recesses 126 of the trays by unloading mechanism generally indicated at 128.

The unloading mechanism 128 generally comprises a vacuum head 130, see FIGS. 1 and 11, having six vacuum cups 132 on its bottom surface to which vacuum is communicated at appropriate times by valving mechanism not shown. The head structure 130 is moved inwardly over the top of workpieces 18 after they are brought into the unloading station 118 by the turret, and the head is thereafter moved downwardly to bring the vacuum cups 132 into engagement with the workpieces 18. Simultaneously therewith, vacuum is communicated to the vacuum cups 132 so that the workpieces are held firmly by the vacuum cups. The vacuum head 130 is thereafter moved outwardly parallel to the spindles 16 until the workpieces 18 clear the spindles and are over a tray 120 supported by the tail sprocket 124 in the unloading position. Thereafter the vacuum head 130 is moved downwardly to position the workpieces 18 in the workpiece receiving recesses 126 in the trays 120. At this time vacuum communication to the head structure 130 is valved off to permit the head 130 to move away from the workpieces in the trays, and the drive structure for the vacuum head thereafter moves upwardly to a point free and clear from the trays. The turret structure is then indexed to bring a succeeding group of spindles with workpieces thereon into the unloading position, and simultaneously therewith the sprocket 124 is moved 32.7° to bring another tray 120 into the unloading position. Indexing of the turret and conveyor is repeated in synchronism to provide a continuous operation. The vacuum head 130 is moved in the path previously described by a drive mechanism generally indicated at 134 and which is similar to the drive mechanism for the loading structure 38 excepting that its camming recess is proportioned to give the motion of the vacuum head previously described.

It sometimes happens that portions of the workpieces 18 remain on the spindles after the spindles are moved out of the unloading station 118, and it is necessary to remove these portions of the workpieces at a stripping station 136 prior to the time that they are brought into the loading station 28. These portions of the workpieces remaining on the spindles are removed by a rake 138 which is fastened to the vacuum head 130 in such position that blades 140 move downwardly to engage the base of the spindle at the same time that the vacuum head lowers the vacuum cups 132 into engagement with the workpieces on the spindles at the unloading station 118. The arrangement of the rake 138 can best be seen in FIG. 1. The blades 140 are beveled to assure that the rakes will pass behind any portions of workpieces remaining on the spindles. The movement of the vacuum head 130 which slides the workpieces off of the spindles at the unloading station 118 moves the blades along the upper surface of the spindles at the stripping station 136 to assure that parts of the workpieces do not remain on the spindles at the time that they are moved into the loading station 28. The unloading mechanism 128 and the sprocket 124 are driven synchronously to assure that they perform their operations in timed relation to movements of the turret 10.

It will be apparent that the objects heretofore enumerated as well as others have been accomplished and that there has been provided a turret structure which is rotated vertically and which has loading and unloading mechanisms of the open tray type located generally beneath the turret to permit use of a grinding wheel of a diameter approaching that of the path of the spindles positioned inside of the path of the spindles.

While the invention has been described in considerable detail, I do not wish to be limited to the particular embodiment shown and described, and it is my intention to cover hereby all novel adaptations, modifications and arrangements thereof, which come within the practice of those skilled in the art to which it relates.

What I claim is:

1. Working transporting apparatus comprising: a turret mounted for rotation about a horizontal axis and having horizontally projecting spindles arranged in a circular pattern at a predetermined radius from said axis, a first conveying mechanism of a type wherein workpieces rest on support surfaces in a first work transfer station, said first work transfer station being positioned adjacent the bottom and to one side of the vertical centerline of said turret, a second conveying mechanism of a type wherein workpieces rest on support surfaces in a second work transfer station, said second work transfer station being positioned adjacent the bottom and to the other side of the vertical centerline of said turret, first means for moving a plurality of workpieces from said first work transfer station onto a group of said spindles, and second means for moving a plurality of workpieces from said turret to the support surfaces of said second conveying mechanism in said second work transfer station, said second means for moving a plurality of workpieces including a vacuum head having a plurality of vacuum cups movable between a pickup position adjacent such plurality of workpieces and a release position adjacent such support surfaces.

2. Work transporting apparatus comprising: a turret mounted for rotation about a horizontal axis and having horizontally projected spindles arranged in a cricular pattern at a predetermined radius from said axis, a first conveying mechanism of a type wherein workpieces rest on support surfaces in a first work transfer station, said work transfer station being positioned adjacent the bottom and to one side of the vertical centerline of said turret, a second conveying mechanism adjacent said turret and having a plurality of work support trays, each of said trays being adapted to receive a plurality of workpieces and being mounted for movement to and from a second work transfer station located beneath and to the opposite side of the vertical centerline of said turret from said first conveying mechanism, first means for moving a plurality of workpieces between said support surfaces in said first work transfer station and a predetermined group of spindles on said turret, second means for transferring a plurality of workpieces between said turret and a tray located at said second work transfer station, said second means for transferring a plurality of workpieces including a vacuum head movable between a pickup position adjacent said turret and a release position adjacent such tray, and at least one work station positioned around said turret for performing work on workpieces carried by said turret.

3. Work transporting apparatus comprising: a turret mounted for rotation about a horizontal axis and having horizontally projecting spindles arranged in a circular pattern at a predetermined radius from said axis, a first conveying mechanism of a type wherein workpieces rest on support surfaces in a first work transfer station, said work transfer station being positioned adjacent the bottom and to one side of the vertical centerline of said turret, a second conveying mechanism adjacent said turret having a plurality of work support trays mounted thereon, each of said trays being adapted to receive a plurality of workpieces and being mounted for movement to and from a second work transfer station located beneath and to the opposite side of the vertical centerline of said turret from said first conveying mechanism with a portion of said second conveying mechanism extending away from said first conveying mechanism, first means for moving workpieces between said support surfaces in said first work transfer station and a predetermined group of spindles on said turret, second means for transferring a plurality of workpieces between said turret and a tray located at said second work transfer station, said second means for transferring a plurality of workpieces including a vacuum head having a plurality of vacuum cups movable between a pickup position adjacent said turret and a release position adjacent such tray, and a grinding wheel positioned inside said circular path of said spindles on said turret for performing work on said workpieces moved between said work transfer stations.

4. Apparatus for contouring annular workpieces comprising: a turret mounted for rotation about a horizontal axis and having horizontally projecting spindles arranged in a circular pattern at a predetermined radius from said axis, a grinding wheel positioned within said circular pattern for rotation about an axis above said axis of said turret, said grinding wheel being adapted to contact workpieces on said spindles at the top of said turret, loading means below said turret for installing workpieces on spindles when adjacent the bottom of said turret, a conveyor having a portion located beneath said turret and to the one side of the vertical centerline of said turret from said loading means, said conveyor extending away from said loading means and having trays mounted thereon for receiving workpieces, each of said trays being adapted to receive a plurality of workpieces and being mounted on said conveyor for movement to and from a work transfer station, and means for removing workpieces axially from said spindles and for thereafter moving the workpieces onto trays positioned in said transfer station, said removing means including a vacuum head movable between a pickup position adjacent said turret and a release position adjacent said tray.

References Cited
UNITED STATES PATENTS

| | | | |
|---|---|---|---|
| 1,531,281 | 3/1925 | Garbin | 51—108 X |
| 1,991,712 | 2/1935 | Theler | 51—108 |
| 2,170,672 | 8/1939 | Anderson | 51—108 |
| 2,670,576 | 3/1954 | Hockett | 51—108 |
| 2,760,537 | 8/1956 | Willsey. | |
| 2,939,572 | 6/1960 | Wurgaft | 198—25 X |

ROBERT C. RIORDON, *Primary Examiner.*

D. G. KELLY, *Assistant Examiner.*